15/622,153

(12) United States Patent
Seidel et al.

(10) Patent No.: US 10,494,496 B2
(45) Date of Patent: Dec. 3, 2019

(54) FIBRE-MATRIX SEMIFINISHED PRODUCT

(71) Applicant: LANXESS DEUTSCHLAND GMBH, Cologne (DE)

(72) Inventors: Stefan Seidel, Paderborn (DE); Matthias Bienmuller, Krefeld (DE); Jochen Endtner, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 111 days.

(21) Appl. No.: 15/622,153

(22) Filed: Jun. 14, 2017

(65) Prior Publication Data
US 2017/0362401 A1  Dec. 21, 2017

(30) Foreign Application Priority Data

Jun. 15, 2016  (EP) ..................... 16174524
Sep. 1, 2016  (EP) ..................... 16186750

(51) Int. Cl.
*C08J 5/24* (2006.01)
*C08J 3/00* (2006.01)
*C08L 77/12* (2006.01)
*C08J 5/10* (2006.01)
*C08K 3/08* (2006.01)
*C08K 5/5313* (2006.01)

(52) U.S. Cl.
CPC ............. *C08J 5/24* (2013.01); *C08J 3/005* (2013.01); *C08J 5/10* (2013.01); *C08K 3/08* (2013.01); *C08K 5/5313* (2013.01); *C08L 77/12* (2013.01); *C08K 2003/0812* (2013.01); *C08K 2003/0881* (2013.01); *C08K 2003/0893* (2013.01); *C08L 2201/02* (2013.01)

(58) Field of Classification Search
CPC ....... C08J 5/04; C08J 5/24; C08J 5/043; C08J 5/08; C08J 5/10; C08J 3/005; C08J 2377/02; C08K 5/56; C08K 5/5205; C08K 5/5317; C08K 5/5313; C08K 13/02; C08K 3/08; C08K 2003/0812; C08K 2003/387; C08K 2003/0881; C08K 2003/0893; C08L 77/02; C08L 77/12; C08L 2201/02
See application file for complete search history.

(56) References Cited

U.S. PATENT DOCUMENTS

| | | | |
|---|---|---|---|
| 5,328,536 A | 7/1994 | Rohleder et al. | |
| 5,474,134 A | 12/1995 | Spoetzl et al. | |
| 8,092,733 B2 | 1/2012 | Hayes et al. | |
| 8,334,046 B2 | 12/2012 | Kirchner et al. | |
| 8,879,075 B2 | 11/2014 | Kitajima | |
| 9,597,861 B2 | 3/2017 | Elia et al. | |
| 2013/0092226 A1 | 4/2013 | Pawlik et al. | |
| 2013/0327479 A1* | 12/2013 | Ichino | C08J 5/24 156/307.3 |
| 2014/0011925 A1* | 1/2014 | Pauchard | C08K 5/5313 524/126 |
| 2014/0041819 A1* | 2/2014 | Zhang | B82Y 30/00 162/102 |
| 2014/0044943 A1* | 2/2014 | Margraf | B32B 7/02 428/215 |
| 2016/0009918 A1* | 1/2016 | Hoerold | C08K 3/32 524/103 |

FOREIGN PATENT DOCUMENTS

| | | | | |
|---|---|---|---|---|
| EP | 1923420 A1 | 5/2008 | | |
| WO | WO-2014135256 A1 * | 9/2014 | | C08K 3/32 |

OTHER PUBLICATIONS

European Search Report from corresponding European Application No. 17170995, dated Oct. 13, 2017, two pages.

* cited by examiner

*Primary Examiner* — Christopher M Rodd

(57) ABSTRACT

A flame-retardant single-, or multi-layered, fiber-matrix semi-finished product has a polyamide-based fiber-matrix that includes at least one organic phosphinic acid salt and/or a diphosphinic acid salt. A process for the production thereof includes impregnating a fiber ply, or plies, and consolidating the ply or plies into a composite.

13 Claims, No Drawings

FIBRE-MATRIX SEMIFINISHED PRODUCT

The present invention relates to single-layered flame-retarded, polyamide-based fibre-matrix semifinished products, to a process for the production thereof and to the use thereof.

BACKGROUND INFORMATION

Fibre-matrix semifinished products in the context of the present invention are composites made of semifinished fibre products in which fibre materials in the form of fibres, fibre bundles or filaments provided as semifinished fibre product plies are enveloped by a protective and ply-determining thermoplastic matrix. Such fibre-matrix semifinished products are also variously referred to by the terms fibre composite, composite or organosheet.

Fibre-matrix semifinished products are produced on a large scale even today for example by Bond-Laminates GmbH, Brilon, Germany in sheet form under the name Tepex®. These fibre-matrix semifinished products in sheet form already possess all the technical properties demanded of components to be manufactured therefrom. Processing of fibre-matrix semifinished products in sheet form to afford the finished component, which is finally employed for example in motor vehicles, is effected in further process steps, in particular by forming, dividing, joining, enhancing, etc.

Textile reinforcement of a fibre-matrix semifinished product employs textile semifinished products in which a multiplicity of individual filaments are suitably interconnected. These are in particular sheetlike textile semifinished products, preferably fabrics, based on endless fibres and optionally also long fibres.

The endless fibres for use for a textile semifinished product feature high mechanical performance at low weight. These are preferably technical fibres, in particular glass or carbon fibres.

High anisotropy is a peculiarity of the textile semifinished products employed as textile reinforcement in fibre-matrix semifinished products. It is only this anisotropy, i.e. the direction-specific properties such as for example the high mass-specific strength and torsional stiffness of textile semifinished products, which allows the production of fibre-matrix semifinished products having great lightweight construction potential, particularly for use in structural and semistructural applications.

However, according to WO 2010/132335 A1 the prior art processes result in fibre-matrix semifinished products which upon closer inspection reveal a layered construction. Here, the matrix resin composition which encapsulates and embeds the textile semifinished product to form an interpenetrating network therewith differs from the surface resin composition. The latter is either free of fibre material or comprises, as in WO 2010/132 335 A1, a different polyamide.

WO 2012/132399 A1 distinguishes, within a fibre-matrix semifinished product, a surface resin composition from a matrix resin composition.

Finally EP 1923420 A1 or else WO 2012/058379 A1 describe in the example section the layered construction of composite materials from films.

However, precisely a layered construction of fibre-matrix semifinished products, also described in the further course of this application as composites or composite materials, can upon employment thereof in mechanically stressed articles of manufacture lead to delamination which is apparent for example in a reduction in flexural strength in the flexural test according to ISO178. There is also a danger of insufficient attachment or reduced attachment of the matrix polymer to the fibre material caused by additives in the matrix resin to be employed, for example flame retardant additives.

Proceeding from this prior art the problem addressed by the present invention was accordingly that of providing flame-retarded fibre-matrix semifinished products not liable to delamination in which despite the use of flame retardant additives the attachment of the matrix polymer to the fibre material is maintained, wherein the criterion for maintenance of bonding is an identical or better flexural strength and "identical" is to be understood as meaning a deviation of not more than ±3% from a reference value for a non-flame-retarded composition.

SUMMARY OF THE INVENTION

The solution to the problem and the subject-matter of the present invention are fibre-matrix semifinished products comprising:

1 to 100 semifinished fibre product plies made of endless fibres, preferably 2 to 40 semifinished fibre product plies made of endless fibres, particularly preferably 2 to 10 semifinished fibre product plies made of endless fibres, wherein the semifinished fibre product plies each have a basis weight in the range from 5 g/m² to 3000 g/m², preferably in the range from 100 g/m² to 900 g/m², particularly preferably in the range from 150 g/m² to 750 g/m², and the entirety of all semifinished fibre product plies is impregnated with a compound comprising as component A) at least one polyamide having a relative solution viscosity in m-cresol to be determined to DIN EN ISO 307 at 25° C. in the range from 2.0 to 4.0 as the matrix polymer, and this fibre-matrix semifinished product has a volume fraction of fibre materials defined according to DIN 1310 in the range from 25% to 65% and a volume fraction of air or gas of less than 15% and wherein based on 100 parts by mass of component A) the compound further comprises as component B) 5 to 100 parts by mass, preferably 10 to 65 parts by mass, particularly preferably 20 to 60 parts by mass, of at least one organic phosphinic acid salt of formula (I) and/or a diphosphinic acid salt of formula (II) and/or polymers thereof,

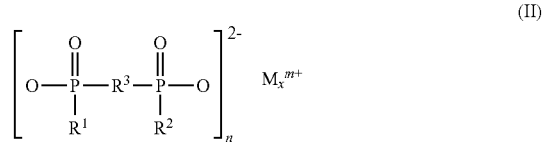

wherein
$R^1$ and $R^2$ are identical or different and represent a linear or branched $C_1$-$C_6$-alkyl, and/or $C_6$-$C_{10}$-aryl,
$R^3$ represents linear or branched $C_1$-$C_{10}$-alkylene, $C_6$-$C_{10}$-arylene or $C_1$-$C_6$-alkylarylene or aryl-$C_1$-$C_6$-alkylene,
M represents aluminium, zinc or titanium and/or a protonated nitrogen base,
m is an integer from 1 to 4, n is an integer from 1 to 3, x is 1 and 2, and n, x and m in formula (II) may simultaneously adopt only integers such that the diphosphinic acid salt of formula (II) as a whole is uncharged and the semifinished fibre product plies comprise the endless fibres in the form of wovens, non-crimp fabrics, multiaxial non-crimp fabrics, stitched fabrics, braids, batts, felts, mats and unidirectional fibre strands or mixtures of these materials.

In the flame-retarded fibre-matrix semifinished products according to the invention the semifinished fibre product plies are uniformly impregnated and consolidated with matrix polymer to an extent such that a delamination of the layers is very largely avoided. Distinguishing between matrix resin composition and surface resin composition is no longer possible on account of the high degree of consolidation and the attachment of the matrix polymer to the fibre material is not significantly reduced by the additization with the flame retardant to be employed in accordance with the invention.

Flexural strength according to ISO178 is used as a measure for delamination in the context of the present application. Test specimens having dimensions of 80 mm·10 mm·1 mm are placed with their ends on two supports and loaded in their centre with a flexing ram (Bodo Carlowitz: Tabellarische Übersicht über die Prüfung von Kunststoffen, 6th edition, Giesel-Verlag for Publizität, 1992, pp. 16-17). A high value for flexural strength then denotes better attachment of the matrix polymer to the fibre material and thus reduced delamination.

It is noted for the avoidance of doubt that the single-layeredness is defined by the entirety of the features pertaining to the semifinished fibre product plies, the basis weight thereof, the polyamide compound, the volume fraction of fibres and the volume fraction of air or gas in relation to the entire fibre-matrix semifinished product, i.e. in the region of the upper surface and the lower surface. A fibre matrix semifinished product for use in accordance with the invention preferably has the characteristic that these features are uniformly present therein as a result of the impregnation process and the consolidation. Uniform impregnation/consolidation is to be understood as meaning in particular the fact that inside the fibre-matrix semifinished product according to the invention, i.e. in the region between two surfaces, there are no regions or sections having a volume fraction of air or gas or a volume fraction of fibre materials outside the ranges recited/claimed above, wherein the region between the surface up to a depth of 50 μm in particular is of relevance.

It is further noted for the avoidance of doubt that all definitions and parameters referred to in general terms or within preferred ranges are encompassed in any desired combinations. Standards cited in the context of this application are to be understood as meaning the version in force on the application date.

Polyamides for use in accordance with the invention may be constructed from only one monomer or from a mixture of at least two polyamides (copolymers, terpolymers etc.). However, according to the invention the term polyamide also comprehends physical mixtures of at least two different polyamides.

However, the present invention also provides a process for producing a single-layered fibre-matrix semifinished product comprising a) providing 1 to 100 semifinished fibre product plies made of endless fibres, preferably 2 to 40 semifinished fibre product plies, particularly preferably 2 to 10 semifinished fibre product pies, wherein the semifinished fibre product plies each have a basis weight in the range from 5 g/m² to 3000 g/m², preferably in the range from 100 g/m² to 900 g/nm, particularly preferably in the range from 150 g/m² to 750 g/m², b) providing a compound comprising as component A) at least one polyamide having a relative solution viscosity in m-cresol to be determined to DIN EN ISO 307 at 25° C. in the range from 2.0 to 4.0, preferably in the range from 2.2 to 3.5, very particularly preferably in the range from 2.4 to 3.1, c) applying the compound to the entirety of all semifinished fibre product plies, d) impregnating and consolidating the entirety of all semifinished fibre product plies with the compound to afford a composite having a volume fraction of fibre materials defined according to DIN 1310 in the range from 25% to 65%, preferably in the range from 30% to 55%, particularly preferably in the range from 40% to 50%, and a volume fraction of air or gas of less than 15%, preferably less than 10%, particularly preferably less than 5%, by the action of temperatures; the melting temperature of the at least one polyamide in the compound and additional pressure on the entirety of all semifinished fibre product plies provided with compound, e) cooling/solldfication to obtain the fibre-matrix semifinished product, wherein based on 100 parts by mass of component A) the compound further comprises as component B) 5 to 100 parts by mass, preferably 10 to 65 parts by mass, particularly preferably 20 to 60 parts by mass, of at least one organic phosphinic acid salt of formula (I) and/or a diphosphinic acid salt of formula (II) and/or polymers thereof,

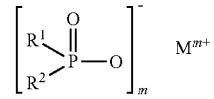

(I)

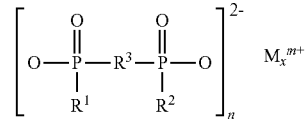

(II)

wherein $R^1$ and $R^2$ are identical or different and represent a linear or branched $C_1$-$C_6$-alkyl, and/or $C_6$-$C_{10}$-aryl, $R^3$ represents linear or branched $C_1$-$C_{10}$-alkylene, $C_1$-$C_6$-arylene or $C_1$-$C_6$-alkylarylene or aryl-$C_1$-$C_6$-alkylene, M represents aluminium, zinc or titanium and/or a protonated nitrogen base, m is an integer from 1 to 4, n is an integer from 1 to 3, x is 1 and 2, and n, x and m in formula (II) may simultaneously adopt only integers such that the diphosphinic acid salt of formula (II) as a whole is uncharged and the semifinished fibre product plies comprise the endless fibres in the form of wovens, non-crimp fabrics, multiaxial non-crimp fabrics, stitched fabrics, braids, batts, felts, mats and unidirectional fibre strands or mixtures of these materials.

Allowing the polyamide compound comprising component B)—and in an alternative embodiment optionally the components C) and/or component D) and/or component E) and/or component F)—to act on the fibre material at temperatures equal to or in excess of the melting point of the polyamide/compound and under pressure brings about a plastification of the polyamide/compound and thus the impregnation of the fibre material which in the context of the subsequent or else simultaneously occurring consolidation ensures exceptional fibre attachment of the matrix polymer despite the presence of flame retardants in the compound.

However, the present invention also provides articles of manufacture comprising at least one flame-retarded, single-layered fibre-matrix semifinished product, wherein the single-layeredness is defined by the entirety of the above-defined features pertaining to the semifinished fibre product plies, the basis weight, the viscosity of the polyamide to be employed, the volume fraction of fibres and the volume fraction of air.

However, the present invention also provides articles of manufacture wherein the single-layered fibre-matrix semifinished product has been over-moulded, under-moulded or surround-moulded with injection moulding materials or functional elements have been moulded on. The latter may be produced from the single-layered fibre-matrix semifinished products according to the invention when either during consolidation or in an additional process step, preferably during a forming step, reinforcements, preferably rib-shaped reinforcement structures, or functional elements are joined to the fibre-matrix semifinished product by injection moulding or by flow moulding.

PREFERRED EMBODIMENTS OF THE INVENTION

The compound preferably has an MVR (melt volume flow rate) according to ISO 1133 in the range from 1 cm$^3$/10 min to 100 cm$^3$/10 min, particularly preferably in the range from 50 cm$^3$/10 min to 100 cm$^3$/10 min. The MVR according to ISO 1133 is determined by means of a capillary rheometer, the material (pellets or powder) being melted in a heatable cylinder and forced, under a pressure resulting from the applied load, through a defined nozzle (capillary). A determination is made of the emerging volume/mass of the polymer melt (the so-called extrudate) as a function of time. A key advantage of the melt volume flow rate is the simplicity of measuring the piston travel for a known piston diameter to determine the volume of melt that has emerged. The unit for MVR is cm$^3$/10 min.

Component C)

In a preferred embodiment the compound further comprises, in addition to components A) and B) component C), at least one salt of melamine and condensed phosphoric acids, preferably in amounts in the range from 1 to 40 parts by mass, particularly preferably in amounts in the range from 4 to 30 parts by mass, very particularly preferably in amounts in the range from 6 to 18 parts by mass, in each case based on 100 parts by mass of component A).

Preference is given to melamine polyphosphate or melamine-intercalated aluminium, zinc or magnesium salts of condensed phosphates. The latter are obtainable for example according to WO2012/025362 A1 and bismelamine zincodiphosphate (EP 2609173 A1), bismelamine alumotriphosphate (EP 2609173 A1) or melamine polyphosphate are particularly preferable. Very particular preference is given to using melamine polyphosphate [CAS No. 218768-84-4]. Melamine polyphosphate is commercially available in a very wide variety of product qualities. Examples thereof include Melapur® 200/70 from BASF, Ludwigshafen, Germany, and also Budit® 3141 from Budenheim, Budenheim, Germany.

It is preferable when component C) is employed such that the weight ratio of component B) to component C) is in the range from 95:5 to 60:40, wherein a weight ratio in the range from 90:10 to 70:30 is preferred and a weight ratio in the range from 85:15 to 75:25—in each case based on 100 parts by weight of a sum of component B) and component C)—is particularly preferred.

Component D)

In a further preferred embodiment the compound further comprises, in addition to components A) to C) or instead of C), component D) zinc borate, preferably in amounts in the range from 0.1 to 20 parts by mass, particularly preferably in amounts in the range from 0.4 to 10 parts by mass, very particularly preferably in amounts in the range from 1 to 4 parts by mass, in each case based on 100 parts by mass of component A).

The term zinc borate in the context of the present invention is to be understood as meaning substances obtainable from zinc oxide and boric acid. Zinc borate for use as component D) comprehends both hydrate-free zinc borates, in particular $ZnO.B_2O_3$, and various hydrates of zinc borates, in particular $ZnO.B_2O_3.2H_2O$ and $2ZnO.3B_2O_3.3$, $5H_2O$, hydrate-free zinc borate qualities being preferred. Examples of employable zinc borates are described in Gmelin Syst.-Nr.32, Zn, 1924, p. 248, Erg.-Bd., 1956, pp. 971-972, Kirk-Othmer (4.) 4, 407-408, 10, 942; Ullmann (5.) A 4, 276; Winnacker-Küchler (4.) 2, 556. Commercially available zinc borate qualities include Firebrake 500 and Firebrake ZB from Deutsche Borax GmbH (Sulzbach, Germany).

Component E)

In a further preferred embodiment the compound further comprises, in addition to components A) to D) or instead of C) and/or D), E) talc, preferably in amounts in the range from 0.01 to 50 parts by mass, particularly preferably in amounts in the range from 0.5 to 20 parts by mass, very particularly preferably in amounts in the range from 1 to 10 parts by mass, in each case based on 100 parts by mass of component A), wherein microcrystalline talc is especially preferred.

Talc [CAS No. 14807-96-6] is a sheet silicate having the chemical composition $Mg_3[Si_4O_{10}(OH)_2]$, which, according to the polymorph, crystallizes as talc-1A in the triclinic crystal system or as talc-2M in the monoclinic crystal system (http://de.wikipedia.org/wiki/Talkum). Talc for use in accordance with the invention is commercially available, for example, under the name Mistron® R10 from Imerys Talc Group, Toulouse, France (Rio Tinto Group).

Microcrystalline talc in the context of the present invention is described in WO 2014/001158 A1, the content of which is fully encompassed by the present disclosure. In one embodiment of the present invention microcrystalline talc having a median particle size d50 determined by SediGraph in the range from 0.5 to 10 μm, preferably in the range from 1.0 to 7.5 μm, particularly preferably in the range from 1.5 to 5.0 μm and very particularly preferably in the range from 1.8 to 4.5 μm is employed.

As described in WO 2014/001158 A1, in the context of the present invention the particle size of the talc for use in accordance with the invention is determined by sedimentation in a fully dispersed state in an aqueous medium with the aid of a "Sedigraph 5100" as supplied by Micrometrics Instruments Corporation, Norcross, Ga., USA. The Sedigraph 5100 provides measurements and a plot of the cumulative weight percentage of particles having a size referred to in the art as "equivalent sphere diameter" (esd), minus the given esd values. The median particle size d50 is the value determined from the particle esd at which 50% by weight of the particles have an equivalent sphere diameter smaller than this d50 value. The underlying standard is ISO 13317-3.

In one embodiment, microcrystalline talc is defined via the BET surface area. Microcrystalline talc for use in accordance with the invention preferably has a BET surface area, which can be determined by analogy with DIN ISO 9277, in the range from 5 to 25 $m^2 \cdot g^{-1}$, particularly preferably in the range from 10 to 18 $m^2 \cdot g^{-1}$, very particularly preferably in the range from 12 to 15 $m^2 \cdot g^{-1}$.

Component F)

In a further preferred embodiment the compound further comprises, in addition to components A) to E) or instead of C) and/or D) and/or E), F) at least one further additive distinct from components B), C), D), E), preferably in amounts in the range from 0.01 to 100 parts by mass, particularly preferably in amounts in the range from 0.1 to 50 parts by mass, very particularly preferably in amounts in the range from 0.3 to 25 parts by mass, in each case based on 100 parts by mass of component A).

Preferred further additives in the context of the present invention are UV stabilizers, heat stabilizers, dyes and pigments, further flame retardants, halogen-free flame retardants being preferred, lubricants and mould release agents, fillers and reinforcers other than talc, laser absorbers, di- or polyfunctional branching or chain-extending additives, gamma-ray stabilizers, hydrolysis stabilizers, acid scavengers, antistats, emulsifiers, nucleating agents, plasticizers, processing aids, flow assistants, and elastomer modifiers. The additives for use as component F) may each be used alone or in admixture/in the form of masterbatches.

The technical superiority of single-layered fibre-matrix semifinished products as demonstrated in the context of the present invention with reference to the rib pull test using a cross tension sample is familiar to those skilled in the art from W. Siebenpfeiffer, Leichtbau-Technologien im Automobilbau, Springer-Wieweg, 2014, pages 118-120 and as described in the examples.

Definitions

The person skilled in the art understands compounding to mean a term from plastics technology which can be equated with plastics processing and which describes the upgrading process of plastics by admixing of added substances (filers, additives etc.) for specific optimization of property profiles, flame retardancy in the present case. Compounding of starting materials to give a compound preferably takes place in extruders, particularly preferably in co-rotating twin screw extruders, counter-rotating twin screw extruders, planetary roller extruders or co-kneaders, and encompasses the process operations of conveying, melting, dispersing, mixing, degassing and pressure build-up. (See: https://de.wikipedia.org/wiki/Compoundierung).

The terms "above", "at" or "approximately" used in the present description are to be understood as meaning that the magnitude or value may be a specific value or a value that is approximately equal. The term is intended to convey that similar values lead to results or effects that are equivalent according to the invention and are encompassed by the invention.

A "fibre" in the context of the present invention is a microscopically homogeneous body having a high ratio of length to cross sectional area. The fibre cross section may be any desired shape but is generally round or oval.

According to "http://de.wikipedia.org/wiki/Faser-Kunststoff-Verbund" a distinction is made between
- chopped fibres, also known as short fibres, having a length in the range from 0.1 to 1 mm,
- long fibres having a length in the range from 1 to 50 mm and
- endless fibres having a length L>50 mm.

Fibre lengths may be determined for example by microfocus x-ray computed tomography (µ-CT); DGZfP annual conference 2007—lecture 47. In one embodiment the endless-fibre-comprising semifinished fibre products for use in accordance with the invention further comprise long fibres.

In the semifinished fibre products for use in accordance with the invention the endless fibres are arranged such that at least one fibre or one fibre strand contacts at least one other fibre or one other fibre strand.

The term "basis weight" describes the mass of a semifinished fibre product ply for use in accordance with the invention as a function of area and in the context of the present invention relates to the dry fibre layer. The basis weight is determined according to DIN EN ISO 12127.

Unless otherwise stated mechanical parameters are determined according to DIN EN ISO14125 in the context of the present invention. All standards recited in the context of the present disclosure relate to the version applicable on the application date.

"Impregnated" in the context of the present invention is to be understood as meaning that the at least one thermoplastic penetrates into the depressions and cavities of the fibre material/semifinished fibre product and wets the fibre material. "Consolidated" in the context of the present invention is to be understood as meaning that a volume fraction of air of less than 15%, preferably less than 10%, particularly preferably less than 5%, is present in the fibre-matrix semifinished product. Impregnation (wetting of the fibre material by the at least one thermoplastic) and consolidation (minimizing the proportion of enclosed gases) may be effected and/or performed simultaneously and/or consecutively.

Preferred Flame Retardants of Component B)

In the formulae (I) or (II) M is preferably aluminium. "Protonated nitrogen bases" is preferably to be understood as meaning the protonated bases of 1,3,5-triazine compounds, particularly preferably melamine. In the formulae (I) and (II) $R^1$ and $R^2$ are preferably identical or different and represent linear or branched $C_1$-$C_6$ alkyl and/or phenyl. $R^1$ and $R^2$ are particularly preferably identical or different and represent methyl, ethyl, n-propyl, isopropyl, n-butyl, tert-butyl, n-pentyl and/or phenyl.

$R^3$ in formula (II) particularly preferably represents methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene. $R^3$ is particularly preferably phenylene or naphthylene. Suitable phosphinates are described in WO-A 97/39053 the content of which in relation to the phosphinates is encompassed by the present application. Particularly preferred phosphinates in the context of the present invention are aluminium and zinc salts of dimethylphosphinate, of ethylmethylphosphinate, of dlethylphosphinate and of methyl-n-propylphosphinate and also mixtures thereof.

In formula (I), m is preferably 2 and 3, particularly preferably 3.

In formula (II), n is preferably 1 and 3, particularly preferably 3.

In formula (II), x is preferably 1 and 2, particularly preferably 2.

Very particular preference is given to using the flame retardant aluminium tris(diethylphosphinate) [CAS No. 225789-38-8] which is obtainable for example from Clariant International Ltd. Muttenz, Switzerland under the trade names Exolit® OP1230 or Exolit® OP1240.

Process Step a)

The semifinished fibre product to be provided in process step a) comprises endless fibres. In one embodiment long fibres may additionally be present. The semifinished fibre product according to the invention preferably comprises no comminuted fibres or particles, in particular no short fibres, the latter having a length in the range from 0.1 to 1 mm.

The semifinished fibre product plies for use in process step a) comprise the endless fibres for use in accordance with the invention in the form of wovens, non-crimp fabrics, multiaxial non-crimp fabrics, stitched fabrics, braids, batts, felts, mats and unidirectional fibre strands or mixtures of these materials. Wovens are particularly preferred. Wovens produced from rovings are very particularly preferred. These make it possible to achieve the highest mechanical parameters, in particular in terms of strength, in the articles of manufacture producible therefrom.

It is preferable to employ endless fibres of glass fibres and/or carbon fibres, particularly preferably of glass fibres. However, it is also possible to use other fibres, in particular of metal, man-made fibres, mineral fibres, natural fibres, either as a mixture with glass fibres and/or carbon fibres or as separate materials selected from the group of wovens, non-crimp fabrics, multiaxial non-crimp fabrics, stitched fabrics, braids, batts, felts, mats and unidirectional fibre strands.

The fabric for use in accordance with the invention s preferably a carbon fibre fabric having a basis weight of not less than 150 g/m².

Carbon fibre fabrics are produced using carbon fibre rovings. These are characterized using the number of threads in a fibre bundle or cable. The number of threads s preferably in the range from 1000 (1 k) to 50 000 (50 k) filaments per fibre bundle. Particularly preferred sizes are 1000 (1 k) filaments per fibre bundle, 3000 (3 k) filaments per fibre bundle, 12 000 (12 k) filaments per fibre bundle, 24 000 (24 k) filaments per fibre bundle, 48 000 (48 k) filaments per fibre bundle or 50 000 (50 k) filaments per fibre bundle. The number of threads is determined according to DIN EN 1049-2/ISO 7211-2.

The fabric for use in accordance with the invention is preferably a glass fibre fabric having a basis weight of not less than 200 g/m², particularly preferably not less than 300 g/m².

Glass rovings for use in accordance with the invention for producing glass fibre fabrics are generally characterized by their filament number. The Tex system has been introduced nationally and internationally according to ISO 1144 and DIN 60905, part 1: "Tex-System; Grundlagen". The tex is a unit and the fundamental parameter of the Tex system. One tax corresponds to a weight of 1 g per 1000 m of roving length. Values preferred in accordance with the invention for glass rovings for use in accordance with invention are in the range from 300 tex to 2400 tex, particularly preferably in the range from 600 tex to 1200 tex. Very particular preference is given to 300 tex, 600 tex, 1100 tex, 1200 tex and 2400 tex glass rovings, in particular 600 tex and 1200 tex.

In one embodiment of the present invention the fibres of the semifinished fibre product plies are surface-modified, particularly preferably with an adhesion promoter/adhesion promoter system.

The carbon fibres for use in accordance with the invention may also be employed with or without an adhesion promoter. Preferred adhesion promoters here are based on urethane, epoxy or acrylate systems.

In the case of glass fibres which are very particularly preferred in accordance with the invention it Is preferable to employ silane-based adhesion promoters/adhesion promoter systems. Silane-based adhesion promoters to be employed in accordance with the invention are described in EP 2468810 A1, the content of which is hereby fully incorporated by reference.

When glass fibres are used in particular, polymer dispersions, emulsifiers, film formers (in particular polyepoxy, polyether, polyolefin, polyvinyl acetate, polyacrylate or polyurethane resins or mixtures thereof), branching agents, further adhesion promoters, lubricants, pH buffers and/or glass fibre processing aids (for example wetting agents and/or antistats) are preferably also used in addition to silanes. The further adhesion promoters, lubricants and other auxiliary materials, methods of producing the sizes, methods of sizing and postprocessing of the glass fibres are known to the person skilled in the art and for example described in K. L. Löwensteln, "The Manufacturing Technology of Continuous Glass Fibres", Elsevier Scientific Publishing Corp., Amsterdam, London, New York, 1983. The glass fibres may be sized by any desired methods, preferably using suitable apparatuses, in particular with spray or roller applicators. The glass filaments drawn at high speed from spinnerets may have sizes composed of adhesion promoter/adhesion promoter system applied to them immediately after their solidification, i.e. even before winding or cutting. However, it is also possible to size the fibres in an immersion bath composed of adhesion promoter/adhesion promoter system subsequent to the spinning process.

The glass fibres especially preferred for use in the semifinished fibre product plies preferably either have a circular cross-sectional area and an average filament diameter in the range from 6 to 18 μm, preferably in the range from 9 to 17 μm, or a flat shape and a noncircular cross-sectional area having an average width in the range from 6 to 40 μm for the principal cross sectional axis and an average width in the range from 3 to 20 μm for the secondary cross sectional axis. The glass fibres are preferably selected from the group of E-glass fibres, A-glass fibres, C-glass fibres, D-glass fibres, S-glass fibres and/or R-glass fibres, particular preference being given to E-glass.

The fibres are in particular finished with a suitable silane-based size system/adhesion promoter/adhesion promoter system.

Particularly preferred silane-based adhesion promoters for the pretreatment of the glass fibres are silane compounds of general formula (III)

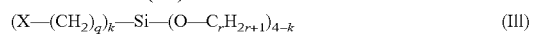

where the substituents are defined as follows:
X represents $NH_2$—, HO— or

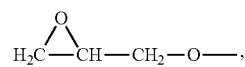

q is an integer from 2 to 10, preferably 3 or 4,
r is an integer from 1 to 5, preferably 1 or 2 and
k is an integer from 1 to 3, preferably 1.

Very particularly preferred adhesion promoters are monomeric organofunctional silanes, in particular 3-aminopropyltrimethoxysilane, aminobutyltrimethoxysilane, 3-aminopropyltriethoxysilane, aminobutyltriethoxylane, 3-aminopropyltrismethoxyethoxysilane, 3-aminopropylmethyldiethoxysilane, N-methyl-2-aminoethyl-3-aminopropyltrimethoxysilane, N-methyl-2-aminoethyl-3-aminopropylmethyldimethoxysilane, N-methyl-3-aminopropyltrimethoxysilane, 3-glycidyloxypropytrimethoxysilane, 3-methacryloxypropyltrimethoxysllane, 3-mercaptopropyltrimethoxysilane, vinyltriethoxysilane, vinyltrimethoxysilane, N-β-(aminoethyl)-γ-aminopropyltrimethoxysilane (Dynasilan Damo from Hüls AG), N-β-(aminoethyl)-γ-aminopropyltriethoxysilane, N-β-(aminoethyl)-γ-aminopropylmethyldimethoxysilane, N-β-(aminoethyl)-N-β-(aminoethyl)-γ-aminopropyttrimethoxysilane.

The silane compounds are generally used in amounts in the range from 0.05 to 5 wt %, preferably in the range from 0.1 to 1.5 wt % and in particular in amounts in the range from 0.25 to 1 wt %, based on the filler, for surface coating.

In one embodiment of the invention combinations of fabrics made of carbon fibres and fabrics made of glass fibres, or fabrics comprising both glass fibres and carbon fibres, are employed. Fabric combinations having a ply construction comprising carbon fibre fabric in the outer plies and glass fibre fabric in at least one inner ply are preferred in the flame-retarded, single layered fibre-matrix semifinished product according to the invention.

In the fabrics preferred for use in accordance with the invention the fibres to be used are arranged such that at least one fibre or one fibre strand contacts at least one other fibre or one other fibre strand. The weaves to be used here and the codes for use therefor are specified in DIN 61101-1 and in DIN ISO 9354.

Fabrics preferred for use in accordance with the invention have a plain, twill, satin, atlas or leno weave. Particular preference is given to fabrics having a plain or twill weave.

Preferred fabrics having a twill weave are twill of uniform line, combined twill, wide twill, steep twill, reclining twill, zigzag twill, herringbone twill, cross twill, with satin or atlas weave.

Particularly preferred twill weaves are 2/2 twill, 2/1 twill or 3/1 twill.

Process Step b)

According to the invention the matrix polymer employed is a compound based on at least one polyamide [component A)] having a relative solution viscosity at 25° C. in m-cresol in the range from 2.0 to 4.0, preferably in the range from 2.2 to 3.5, very particularly preferably in the range from 2.4 to 3.1. Measurement of the relative solution viscosity $\eta_{rel}$ is effected according to EN ISO 307. The ratio of the efflux time t of the polyamide dissolved in m-cresol to the efflux time t (0) of the solvent m-cresol at 25° C. gives the relative solution viscosity in accordance with the formula $\eta_{rel}=t/t(0)$.

The polyamide (PA) for use as component A) may be synthesized from different building blocks and produced by various processes and in specific applications may be employed alone or may be converted in a manner known to those skilled in the art into materials of construction having specifically adjusted combinations of properties. Also suitable are PA blends having proportions of other polymers, preferably of polyethylene, polypropylene, ABS, wherein one or more compatibilizers may optionally be employed.

The properties of the polyamrides may be improved as required by addition of elastomers.

A multiplicity of procedures for producing PA have become known and depending on the desired end product different monomeric building blocks or various chain transfer agents are used to establish a target molecular weight or else monomers having reactive groups for subsequently intended aftertreatments are used.

PA to be used with preference is produced by polycondensation in the melt, wherein in the context of the present invention the hydrolytic polymerization of lactams is also to be understood as being a polycondensation.

PA preferred for use in accordance with the invention derives from diamines and dicarboxylic acids and/or lactams having at least 5 ring members or corresponding amino acids. Preferably contemplated reactants are aliphatic and/or aromatic dicarboxylic acids, particularly preferably adipic acid, 2,2,4-trimethyladipic acid, 2,4,4-trimethyladipic acid, azelaic acid, sebacic acid, isophthalic acid, terephthalic acid, aliphatic and/or aromatic diamines, particularly preferably tetramethylenediamine, hexamethylenediamine, nonane-1,9-diamine, 2,2,4- and 2,4,4-trimethylhexamethylenediamine, the isomeric diaminodicyclohexylmethanes, diaminodicyclohexylpropanes, bis(aminomethyl)cyclohexane, phenylenediamines, xylylenediamines, aminocarboxylic adds, in particular aminocaproic acid, or the corresponding lactams. Copolyamides of a plurality of the recited monomers are included.

Particular preference is given to employing PA composed of lactams, very particular preference being given to caprolactams, especial preference being given to ε-caprolactam.

Also employable in accordance with the invention is PA produced by activated anionic polymerization or copolyamide produced by activated anionic polymerization having polycaprolactam as the main constituent. Activated anionic polymerization of lactams to afford polyamides is performed on an industrial scale by producing firstly a solution of catalyst in lactam, optionally together with additives, in particular with impact modifiers, and secondly a solution of activator in lactam, wherein typically both solutions have a composition such that combination in the same ratio affords the desired overall recipe. Further additives may optionally be added to the lactam melt. Polymerization is effected by mixing the individual solutions to afford the overall recipe at temperatures in the range from 80° C. to 200° C., preferably at temperatures in the range from 100° C. to 140° C. Suitable lactams include cyclic lactams having 6 to 12 carbon atoms, preferably laurolactam or ε-caprolactam, particularly preferably ε-caprolactam. The catalyst is an alkali metal or alkaline earth metal lactamate, preferably in the form of a solution in lactam, particularly preferably sodium caprolactamate in ε-caprolactam. Activators in the context of the present invention that may be employed include N-acyl lactams or acid chlorides or, preferably, aliphatic isocyanates, particularly preferably oligomers of hexamethylene diisocyanate. Activator may be used as pure substance and, preferably, as a solution, preferably in N-methylpyrrolidone.

It is preferable to employ semicrystalline polyamides in the compound for the matrix polymer. According to DE 10 2011 084 519 A1 semicrystalline polyamides have an enthalpy of fusion in the range from 4 to 25 J/g measured by the DSC method to ISO 11357 in the 2nd heating and integration of the melt peak. By contrast, amorphous polyamides have an enthalpy of fusion of less than 4 J/g measured by the DSC method to ISO 11357 in the 2nd heating and integration of the melt peak. Particularly suitable are polyamides having a number of amino end groups in the range from 25 to 90 mmol/kg, preferably in the range from 30 to 70 mmol/kg, very particularly preferably in the range from 35 to 60 mmol/kg.

It is very particularly preferable to employ as the matrix polymer a compound based on polyamide 6 or on polyamide 66 or on aliphatic and/or aromatic polyamides/copolyamides and having 3 to 11 methylene groups in the polymer chain per polyamide group. It is especially preferable to employ as the matrix polymer a compound based on polyamide 6 [CAS No. 25038-54-4] or on polyamide 66 [CAS No. 32131-17-2]. The nomenclature of the polyamides used in the context of the present application corresponds to the international standard EN ISO 1874-1:2010, the first number(s) denoting the number of carbon atoms in the starting diamine and the last number(s) denoting the number of carbon atoms in the dicarboxylic acid. If only one number s stated, as in the case of PA6, this means that the starting material was an α,ω-aminocarboxylic acid or the lactam derived therefrom, i.e. t-caprolactam in the case of PA6.

It is preferable when component B) and the optionally employable components C) and/or component D) and/or component E) and/or component F) are dispersed in the at least one polyamide during compounding. This dispersing is preferably effected by means of a melt mixing process. Mixing apparatuses to be used for such a melt mixing process are preferably single- or twin-screw extruders or Banbury mixers. The respective components/the flame retardant for use as component B) are added either all at once in a single stage or stepwise and then mixed in the melt of the polyamide. In the case of stepwise addition of the additives to the polyamide initially a portion of the additives are added thereto and mixed in the melt thereof. Further additives are then added and the mixture is mixed until a homogeneous polyamide preparation, the compound for use in accordance with the invention, is obtained. This mixture is extruded, cooled until pelletizable and then pelletized.

The application of the compound to the entirety of the semifinished fibre product plies is preferably effected using solvent, using a film, in the form of a melt or in powder form. It is particularly preferable when the compound for use as matrix is provided in the form of a powder or in the form of a film in process step b), especially preferably in powder form.

In the case of the preferred application in the form of powder the compound is generally present as pellets, flakes or in the form of other macroscopic pieces. The grinding of the compound to afford a powder is preferably effected at low temperatures as so-called cryogenic grinding. In the case of application in the form of a film the compound is subjected to an extrusion process.

In an alternative embodiment the compound may be provided for application onto the semifinished fibre product plies comprising endless fibres in the form of a melt or dispersion in a solvent.

In an alternative process the compound already present in the form of a powder and comprising at least components A) and B) may also be mixed with further pulverulent components. The compound present in the form of a powder is preferably mixed with other pulverulent components in a powder mixer. It is likewise possible to admix only a portion of the components via the melt mixing process and to subsequently admix the remaining portion with the compound ground to a powder.

Process Step c)

Application of the compound to the entirety of the semi-finished fibre product plies, also referred to as the semifinished textile product, in process step c) is effected by conventional means, preferably by broadcasting, percolating, printing, spraying, immersing, wetting in a melt bath, thermal spraying or flame spraying or by fluidized bed coating processes. In one embodiment a plurality of layers of the compound may be applied to the entirety of all semifinished product plies. In one embodiment the compound is applied to the entirety of the semifinished fibre product piles in the form of a film.

The application of the compound onto the entirety of all semifinished fibre products plies is preferably effected in amounts such that a resultant volume fraction of fibre materials defined according to DIN 1310 in the fibre-matrix semifinished product is 25% to 65%, preferably 30% to 55%, and particularly preferably 40% to 50%.

In one embodiment powder application is followed by a sintering step where the pulverulent compound on the entirety of all semifinished fibre product plies is sintered. The sintering, optionally under pressure, heats the pulverulent compound powder but the temperature remains below the melting temperature of the polyamide employed in the compound. This generally results in shrinkage because the powder particles undergo densification and pore spaces in the entirety of all semifinished fibre product plies, also known as semifinished textile product, are filled.

The semifinished fibre product provided with compound is subsequently subjected to the influence of pressure and temperature in process step d). This is preferably effected with preheating of the semifinished textile product provided with compound outside the pressure zone.

Process Step d)

In process step d) the semifinished textile product provided with compound is heated to initiate impregnation and consolidation thereof. Pressure is also used to this end.

The influence of pressure and heat causes the compound to melt and penetrate the fibre plies of the semifinished textile product whose fibres are thus impregnated. The escape of any air present or of gas formed in process step d) from the cavities of the semifinished textile product but also from the cavities between the compound and the fibre material causes consolidation to take place. The gases preferably comprise gases from the environment, in particular air or nitrogen, and/or water, preferably in vapour form, and/or thermal decomposition products of the employed polyamide.

It is preferable to employ a pressure in the range from 2 to 100 bar, particularly preferably in the range from 10 to 40 bar, in process step d).

The temperature to be employed in process step d) is not less than the melting temperature of the at least one polyamide/of the compound comprising at least polyamide and flame retardant. In one embodiment the temperature to be employed in process step d) is at least 10° C. above the melting temperature of the at least one polyamide. In a further embodiment the temperature to be employed is at least 20° C. above the melting temperature of the at least one polyamide. Healing may be effected by a great many means, preferably contact heating, radiative gas heating, infrared heating, convection or forced convection, induction heating, microwave heating or combinations thereof. Consolidation is effected immediately thereafter.

The procedures of impregnation and consolidation depend in particular on the parameters temperature and pressure. In one embodiment the pressure to be employed is further dependent on time.

The recited parameters are employed in this manner until the resulting fibre-matrix semifinished product has a content of air or gas of less than 15 vol %, preferably of less than 10 vol %, in particular of less than 5 vol %. It is particularly preferably sought to achieve the content of air or gas, i.e. the cavity content, of less than 5% within a duration of less than 10 minutes at temperatures above 100° C., particularly preferably at temperatures in the range from 100° C. to 350° C. It is preferable to employ pressures above 20 bar.

The application of pressure may be effected via a static process or via a continuous process (also known as a dynamic process), a continuous process being preferred for reasons of speed.

In one embodiment the fibre-matrix semifinished finished product to be manufactured may be shaped into a desired geometry or configuration in process step d) by a shaping process to be employed simultaneously. Preferred shaping processes for geometric shaping of fibre-matrix semifinished products are compression moulding, stamping, pressing or any process using heat and/or pressure. Pressing is particularly preferred. In the shaping process pressure is preferably applied using a hydraulic compression mould. Pressing comprises preheating to a temperature above the melting temperature of the polyamide/compound and using a mould, a moulding device or a moulding tool, in particular at least one compression mould, to achieve the desired shape/geometry of the articles of manufacture to be produced from the single-layered fibre-matrix semifinished product according to the invention.

The most complete impregnation possible of the semifinished fibre product plies for use in accordance with the invention is desirable to achieve optimal mechanical properties in the flame-retarded, single-layered fibre-matrix semifinished product to be produced. The degree of Impregnation may be measured via an ideally low cavity content/gas proportion, in particular via a density determination according to DIN EN ISO 1183-1 (2013-04) or by polished section microscopy.

The principle of impregnation is the saturation of a dry fibrous structure with a matrix composed of thermoplastics/thermoplastic preparation. The flow through the semifinished fibre product is comparable with the flow of an incompressible fluid through a porous base medium. The flow is described using the Navier-Stokes equation:

$$\rho \frac{dv}{dt} = -\nabla P + \eta \nabla^2 v$$

wherein ρ is the density, v the velocity vector, ∇P the pressure gradient and η the viscosity of the fluid used. If it is assumed that the flow velocity of the compound for use in accordance with the invention—also referred to as the matrix—in the reinforcing structure should be categorized as low the inertial forces in the above equation (the left-hand side thereof) may be neglected. The equation is accordingly simplified to the form known as the Stokes equation.

$$0 = -\nabla P + \eta \nabla^2 v$$

Consolidation which is to be understood as meaning expression of enclosed air and other gases takes place at the same time as impregnation or following impregnation. Consolidation also depends in particular on the parameters temperature and pressure and may also depend on time.

Both properties, the degree of impregnation and the degree of consolidation, may be measured/checked by determination of mechanical parameters, in particular by measurement of the tensile strength of fibre-matrix semifinished product test specimens. Tensile strength is determined using the tensile test, a quasistatic, destructive test method performed, in the case of plastics, according to ISO 527-4 or -5.

Since both the impregnation operation and the consolidation operation are dependent on the parameters temperature and pressure, those skilled in the art will adapt these parameters to the polyamide to be used in each case. Those skilled in the art will also adapt the duration over which the pressure is applied according to the polyamide to be used.

In order that impregnation and consolidation result in single-layered fibre-matrix semifinished products according to the invention, process step d) is preferably performed in at least one continuous compression mould, double belt press or interval heating press. It is especially preferable to use a double belt press.

The preferred impregnation technique is lamination. Preferred lamination techniques include without limitation calender, flat bed lamination and double belt press lamination. When the impregnation process is performed as a lamination it is preferable to employ a cooled double belt press (see EP 0 485 895 B1) or an interval heating press.

The impregnation process according to the invention exhibits rapid impregnation and high productivity and makes it possible to manufacture single-layered fibre-matrix semifinished products at high rates and with a low proportion of pores or air inclusions.

Process Step e)

After consolidation the fibre-matrix semifinished product manufactured is allowed to cool to a temperature below the melt temperature of the matrix polymer/of the compound comprising polyamide and flame retardant, also referred to as solidification, and withdrawn from the press. The term solidification describes the setting of the mixture of fibre structure and liquid matrix by cooling or by chemical crosslinking to afford a solid body. The single-layered fibre-matrix semifinished product according to the invention is preferably generated in sheet form after the pressing operation. In the case of a simultaneous shaping the single-layered fibre-matrix semifinished product according to the invention may also be generated in a shaping operation to be specified.

However, if a shaping operation had been simultaneously effected in process step d) the fibre-matrix semifinished product is withdrawn from the mould after cooling to a temperature below the melting temperature of the matrix polymer/the compound comprising polyamide and flame retardant, preferably to room temperature (23+/−2° C.).

In the production of thermoplastic FPC semifinished sheets such as the fibre-matrix semifinished products according to the invention a distinction is made between film stacking, prepreg and direct processes depending on the material throughputs to be achieved (FPC=fibre-plastic composite). For a high material throughput in the case of direct processes the matrix and the textile component are brought together directly in the region of the material feed to the pressing process. This is generally associated with high plant complexity. In addition to the prepreg processes the film stacking process is often used for small to medium amounts. Here, a construct consisting of alternatingly arranged film and textile plies passes through the pressing process. The nature of the pressing process is determined by the required material output and the material diversity. A distinction is made here in order of increasing material throughput between static, semicontinuous and continuous processes. Plant complexity and plant costs rise with increasing material throughput (AKV—Industrievereinigung Verstärkte Kunststoffe e.V., Handbuch Faserverbund-Kunststoffe, 3rd edition, 2010, Vieweg-Teubner, 236).

Single-layered and also flame-retarded fibre-matrix semifinished products according to the invention may be used for a multiplicity of applications. They are preferably used in the automotive sector as components for passenger vehicles, heavy goods vehicles, commercial aircraft, in aerospace, in trains, but also for garden and domestic appliances, as computer hardware, in handheld electronic devices, in leisure articles and sports equipment, as structural components for machines, in buildings, in photovoltaic systems or in mechanical apparatuses. The respective uses may require appropriately additivized compounds for providing to the semifinished fibre product.

Over-Moulded, Surround-Moulded, Under-Moulded or Moulded-on Variants

In one embodiment the single-layered fibre-matrix semifinished product according to the invention is over-moulded, surround-moulded, under-moulded or functional elements are moulded on. Over-moulding, surround-moulding, under-moulding or moulding-on of further functional elements is effected by casting or injection moulding, preferably injection moulding. This may be effected in allover, partial or circulatory fashion. The injection moulding may be under-moulding and/or moulding-on and/or surround-moulding. This technique is known as in-mould forming (IMF), an integrative special injection moulding process used for producing hybrid structural components from different materials of construction; see http://www.industrieanzeiger.de-home/-/article12503/11824771/. IMF makes it possible to include exposed reinforcing fibres in the edge region of a fibre-matrix semifinished product. This affords a structural component having particularly smooth edges. However, IMF also allows a functional element for on-forming to be formed and simultaneously joined to the fibre-matrix semifinished product component, in particular without the use of additional adhesives. The principle of IMF is also known from DE 4101106 A1, U.S. Pat. Nos. 6,036,908 B, 6,475,423 B1 or WO 2005/070647 A1.

The same plastics already employed as the matrix polymer in the single-layered fibre-matrix semifinished product according to the invention, i.e. in this case polyamides, preferably semicrystalline polyamides, are preferably suitable as an injection moulding composition for use in the IMF application preferred in accordance with the invention. Especial preference is given to using PA 6 or PA 66 or compounds based on these polyamides as the injection moulding material.

In a very particularly preferred embodiment both the fibre-matrix semifinished product component and the injection moulding component for use in IMF are manufactured from the same polyamide.

Preferred functional elements made of the injection moulding component are fixings or holders and other applications which must be formed not by the fibre-matrix semifinished product component but, due to possible geometric complexity, by IMF by the injection moulding component.

To perform IMF a single-layered fibre-matrix semifinished product according to the invention is placed in a mould, preferably an injection mould, having an appropriately shaped mould cavity.

The injection moulding component is then injected. The aim here is to produce a cohesive join between the polymer of the fibre-matrix semifinished product component and the polymer of the injection moulding component. Such a cohesive join is best achieved when both plastics have the same polymer basis. It is preferable in accordance with the invention when both components are based on polyamide 8, IMF also being dependent on process parameters such as melt temperature and pressure.

The present invention preferably relates to fibre-matrix semifinished products comprising 1 to 100 semifinished fibre product plies, preferably 2 to 40 semifinished fibre product plies, particularly preferably 2 to 10 semifinished fibre product plies made of endless fibres, wherein the semifinished fibre product plies each have a basis weight in the range from 5 g/m² to 3000 g/m², preferably in the range from 100 g/m² to 900 g/m², particularly preferably in the range from 150 g/m² to 750 g/m², and the entirety of all semifinished fibre product plies is impregnated with a compound comprising as component A) polyamide 6, and the fibre-matrix semifinished product has a volume fraction of fibre materials defined according to DIN 1310 in the range from 25% to 65%, preferably in the range from 30% to 55%, particularly preferably in the range 40% to 50%, and a volume fraction of air or gas of less than 15%, preferably less than 10%, particularly preferably less than 5%, and wherein based on 100 parts by mass of component A) the compound further comprises as component B) 5 to 100 parts by mass of aluminium tris(diethylphosphinate) and the semifinished fibre product plies comprise the endless fibres in the form of wovens or non-crimp fabrics, preferably wovens.

The present invention particularly preferably relates to fibre-matrix semifinished products comprising 1 to 100 semifinished fibre product plies, preferably 2 to 40 semifinished fibre product plies, particularly preferably 2 to 10 semifinished fibre product piles made of endless fibres, wherein the semifinished fibre product plies each have a basis weight in the range from 5 g/m² to 3000 g/m², preferably in the range from 100 g/m² to 900 g/m², particularly preferably in the range from 150 g/m² to 750 g/m², and the entirety of all semifinished fibre product plies is impregnated with a compound comprising as component A) polyamide 6 as the matrix polymer, and the fibre-matrix semifinished product has a volume fraction of fibre materials defined according to DIN 1310 in the range from 25% to 65%, preferably in the range from 30% to 55%, particularly preferably in the range 40% to 50%, and a volume fraction of air or gas of less than 15%, preferably less than 10%, particularly preferably less than 5%, and wherein based on 100 parts by mass of component A) the compound further comprises as component B) 5 to 100 parts by mass of aluminium tris(diethylphosphinate) and in addition as component C) melamine polyphosphate preferably in amounts in the range from 1 to 40 parts by mass based on 100 parts by mass of component A) and the semifinished fibre product plies comprise the endless fibres in the form of wovens or non-crimp fabrics, preferably wovens.

The present invention very particularly preferably relates to fibre-matrix semifinished products comprising 1 to 100 semifinished fibre product plies, preferably 2 to 40 semifinished fibre product plies, particularly preferably 2 to 10 semifinished fibre product plies made of endless fibres, wherein the semifinished fibre product plies each have a basis weight in the range from 5 g/m² to 3000 g/m², preferably in the range from 100 g/m² to 900 g/m², particularly preferably in the range from 150 g/m² to 750 g/m², and the entirety of all semifinished fibre product plies is impregnated with a compound comprising as component A) polyamide 6, and the fibre-matrix semifinished product has a volume fraction of fibre materials defined according to DIN 1310 in the range from 25% to 65%, preferably in the range from 30% to 55%, particularly preferably in the range 40% to 50%, and a volume fraction of air or gas of less than 15%, preferably less than 10%, particularly preferably less than 5% and wherein based on 100 parts by mass of component A) the compound further comprises as component 8) 5 to 100 parts by mass of aluminium tris(diethylphosphinate), as component C) melamine polyphosphate preferably in amounts in the range from 1 to 40 parts by mass and in addition as component D) zinc borate preferably in amounts in the range from 0.1 to 20 parts by mass in each case based on 100 parts by mass of component A) and the semifinished fibre product plies comprise the endless fibres in the form of wovens or non-crimp fabrics, preferably wovens.

The present invention especially preferably relates to fibre-matrix semifinished products comprising 1 to 100 semifinished fibre product plies, preferably 2 to 40 semifinished fibre product plies, particularly preferably 2 to 10 semifinished fibre product plies made of endless fibres, wherein the semifinished fibre product plies each have a basis weight in the range from 5 g/m² to 3000 g/m², preferably in the range from 100 g/m² to 900 g/m², particularly preferably in the range from 150 g/m² to 750 g/m², and the entirety of all semifinished fibre product plies is impregnated with a compound comprising as component A) polyamide 6, and the fibre-matrix semifinished product has a volume fraction of fibre materials defined according to DIN 1310 in the range from 25% to 65%, preferably in the range from 30% to 55%, particularly preferably in the range 40% to 50%, and a volume fraction of air or gas of less than 15%, preferably less than 10%, particularly preferably less than 5% and wherein based on 100 parts by mass of component A) the compound further comprises as component B) 5 to 100 parts by mass of aluminium tris(diethylphosphinate), as component C) melamine polyphosphate preferably in amounts in the range from 1 to 40 parts by mass, as component D) zinc borate preferably in amounts in the range from 0.1 to 20 parts by mass and in addition as component E) talc preferably in amounts in the range from 0.01 to 50 parts by mass in each case based on 100 parts by mass of component A) and the semifinished fibre product plies comprise the endless fibres in the form of wovens or non-crimp fabrics, preferably wovens.

The present invention also relates to the use of at least one organic phosphinic acid salt of formula (I) and/or a diphosphinic acid salt of formula (II) and/or polymers thereof as component B) for flameproofing single-layered, polyamide (component A))-based, endless-fibre-reinforced fibre-matrix semifinished products and the semifinished fibre product plies comprise the endless fibres in the form of wovens or non-crimp fabrics, preferably wovens.

The invention preferably relates to the use of the combination of at least one compound of component B) with at least one compound of component C) for flameproofing single-layered, polyamide-based, endless-fibre-reinforced fibre-matrix semifinished products and the semifinished fibre product plies comprise the endless fibres in the form of wovens or non-crimp fabrics, preferably wovens.

The present invention particularly preferably relates to the use of the combination of at least one compound of component B) with at least one compound of component C) and at least one compound of component D) for flameproofing single-layered, polyamide-based, endless-fibre-reinforced fibre-matrix semifinished products and the semifinished fibre product plies comprise the endless fibres in the form of wovens or non-crimp fabrics, preferably wovens.

The present invention very particularly preferably relates to the use of the combination of at least one compound of component B) with at least one compound of component C) and at least one compound of component D) and at least one compound of component E) for flameproofing single-layered, polyamide-based, endless-fibre-reinforced fibre-matrix semifinished products and the semifinished fibre product plies comprise the endless fibres in the form of wovens or non-crimp fabrics, preferably wovens.

The invention further relates to a process for flameproofing single-layered, polyamide (component A))-based, endless-fibre-reinforced fibre-matrix semifinished products without a reduction in fibre attachment by using as component B) at least one organic phosphinic acid salt of formula (I) and/or a diphosphinic acid salt of formula (II) and/or polymers thereof and the semifinished fibre product plies comprise the endless fibres in the form of wovens or non-crimp fabrics, preferably wovens.

The invention preferably relates to a process for flameproofing single-layered polyamide-based, endless-fibre-reinforced fibre-matrix semifinished products without a reduction in fibre attachment by combining at least one compound of component B) with at least one compound of component C) and the semifinished fibre product plies comprise the endless fibres in the form of wovens or non-crimp fabrics, preferably wovens.

The present invention particularly preferably relates to a process for flameproofing single-layered polyamide-based, endless-fibre-reinforced fibre-matrix semifinished products without a reduction in fibre attachment by combining at least one compound of component B) with at least one compound of component C) and at least one compound of component D) and the semifinished fibre product plies comprise the endless fibres in the form of wovens or non-crimp fabrics, preferably wovens.

The present invention very particularly preferably relates to a process for flameproofing single-layered polyamide-based, endless-fibre-reinforced fibre-matrix semifinished products without a reduction in fibre attachment by combining at least one compound of component B) with at least one compound of component C), at least one compound of component D) and at least one compound of component E) and the semifinished fibre product plies comprise the endless fibres in the form of wovens or non-crimp fabrics, preferably wovens.

It will be understood that the specification and examples are illustrative but not limitative of the present invention and that other embodiments within the spirit and scope of the invention will suggest themselves to those skilled in the art.

EXAMPLES

Thermoplastic Matrix

The thermoplastic matrix was prepared by compounding. To this end, the individual components were mixed in a twin-screw extruder (ZSK 26 Compounder from Coperion Wemrer & Pfleiderer (Stuttgart, Germany)) at temperatures in the range from 25° C. to 310° C. and the resulting mixture was extruded, cooled until pelletizable, pelletized and subsequently milled.

The experiments employed as thermoplastic matrix i):

Component A): Polyamide 6 having a relative solution viscosity in m-cresol of 2.5 at 25° C., (Durethan® B26, from Lanxess Deutschland GmbH, Leverkusen, Germany)

Component B): Aluminium tris(diethylphosphinate), [CAS No. 225789-38-8] (Exolit® OP1240 from Clarant SE, Muttenz, Switzerland)

Component C): Melamine polyphosphate [CAS No. 218768-84-4] (Melapur® 200/70 from BASF, Ludwigshafen, Germany)

Component D): Zinc borate, [CAS No. 12767-90-7] (Firebrake® 500 from Deutsche Borax GmbH Sulzbach, Germany)

Component E): Talc (microcrystalline), [CAS No. 14807-96-6], Mistron® R10 from Imerys Talc Group, Toulouse, France (Rio Tinto Group).

Component F): Further additives selected from pigments (carbon black [CAS No. 1333-88-4]), mould release agents (ethylene bisstearylamide [CAS No. 110-30-5] as Loxiol® EBS from Emery Oleochemicals) and heat stabilizer (1,6-bis[3-(3,5-di-tert-butyl-4-hydroxyphenyl)propionylamino]hexane [CAS-No. 23128-74-7] as Irganox® 1098 from BASF, Ludwigshafen, Germany). The composition of component F) is the same in all examples.

Semifinished Fibre Product

The semifinished fibre product plies comprising endless fibres used in the examples and in the comparative example for the composites were a twill fabric made of filament glass having a 2/2 twill weave with 0.2 wt % silane size and a basis weight of 200 g/m². The density of the glass employed therefor was 2.56 g/cm³.

Semifinished Composite Products

The semifinished composite products of the examples and the comparative example were produced on a static hot platen press. The fibre-matrix semifinished products having an edge length of 420 mm×420 mm consisted of 2 or 4 semifinished fibre product plies and in one case a polyamide compound matrix M1 and in another case a polyamide compound matrix M2, which were applied and distributed uniformly over the entirety of all semifinished fibre product plies and in each case resulted in an average fibre-volume content of 45% and in a thickness of 0.5 mm for 2 plies of semifinished fibre products or 1 mm for 4 plies. To achieve consolidation and impregnation to afford the fibre-matrix semifinished product a surface pressure of 24 bar and a temperature of 300° C. were applied for 240 s in each case. Subsequent cooling to room temperature was effected over 300 s at constant pressure. The semifinished fibre product plies were thus homogeneously embedded in the sheet-form fibre-matrix semifinished product formed, no material/phase boundaries were formed in the matrix on account of the uniform single-layered matrix system; in terms of substance it was not possible to distinguish between inner embedding material and surface.

Semifinished Composite Product 2 (Test Speciment for Mechanical Testing According to ISO178)

For comparison, a fibre-matrix semifinished product having an edge length of 420 mm×420 mm was produced from 4 semifinished fibre product plies and a polyamide matrix M3 which was uniformly produced with an average fibre volume content of 45%/in a thickness of 1 mm. To achieve consolidation and impregnation, here too a surface pressure of 24 bar was applied for 240 s at a temperature of 300° C. Subsequent cooling to room temperature was effected over 300 s at constant pressure. The semifinished fibre product piles were thus homogeneously embedded in the sheet-form semifinished composite product 2 formed, no material/phase boundaries were formed in the matrix on account of the uniform single-layered matrix system; in terms of substance it was not possible to distinguish between inner embedding material and surface.

The fibre volume content was in all cases analysed according to DIN 1310. For statistical reasons 5 test specimens were analysed in each case.

The semifinished composite products of type 1 and 2 were subjected to further experimental analysis for pore content, i.e. inclusion of air or gas. To this end a General Electric Micro CT nanotom S instrument was used to analyse tomographs of a cross section of semifinished composite products 1 and of semifinished composite product 2. For statistical reasons three test specimens were analysed in each case, with 5 repeat measurements being performed on each of these. A pore content of 4-5% was determined for all semifinished composite products using optical evaluation software. For statistical reasons three test specimens were analysed in each case, with 5 repeat measurements being performed on each of these.

The type 1 and type 2 semifinished composite products were also subjected to experimental analysis for local fibre volume content. To this end a General Electric Micro CT nanotom S instrument was used to analyse tomographs of a cross section of semifinished composite product 1 and semifinished composite product 2. The glass fibre content inside the samples was evaluated to a depth of 50 μm. For statistical reasons three test specimens of every semifinished composite product were analysed in each case, with 5 repeat measurements being performed on each of these. For semifinished composite products of type 2 no glass fibres were detected down to a depth of 50 μm since said fibres are separate from the surface and covered by the unfilled surface layer. The fibre volume fraction in this region was thus 0%. In the semifinished composite products of type 1 no separating covering layers were detected but rather the glass fibre bundles were homogeneously enclosed and uninterrupted right up to the surface so that the claimed fibre volume fraction was found even in the region between the surface down to a depth of 50 μm.

The flame retardancy of the fibre-matrix semifinished products was determined according to method UL94V (Underwriters Laboratories Inc. Standard of Safety, "Test for Flammability of Plastic Materials for Parts in Devices and Appliances", p. 14-18 Northbrook 1998). The specimens used therefor and having the dimensions 125 mm·13 mm·0.5 mm in thicknesses were cut out of the prefabricated fibre-matrix semifinished products ("semifinished composite product") using a waterjet cutting apparatus.

Mechanical specifications were obtained from flexural strength from flexural tests according to ISO 178. To this end specimens having the dimensions 80 mm·10 mm·1 mm were cut out of the prefabricated fibre-matrix semifinished products ("semifinished composite product") using a waterjet cutting apparatus.

The results were evaluated according to the magnitude of the flexural strength measured in MPa, in each case based on a fibre volume fraction of 45%, wherein "o" corresponds to the reference value without flame retardant additives used for evaluation. A "+" denotes a flexural strength which is identical or higher compared to the reference value, wherein "identical" is to be understood as meaning values which, taking into account measurement accuracy, are within ±3% of the reference value. A "−" denotes a flexural strength which is lower than the reference value by more than 3%.

TABLE 1

Thermoplastic matrix

|  |  | M1 | M2 | M3 |
|---|---|---|---|---|
| Component A) | [parts by wt] | 100 | 100 | 100 |
| Component B) | [parts by wt] | 50 | 50 |  |
| Component C) | [parts by wt] | 11.5 | 11.5 |  |
| Component D) | [parts by wt] | 2.3 | 2.3 |  |
| Component E) | [parts by wt] |  | 5 |  |
| Component F) | [parts by wt] | 1.5 | 1.5 | 1.5 |

TABLE 2

Semifinished composite product

|  |  | Ex. 1 | Ex. 2 | Comp. 1 |
|---|---|---|---|---|
| Thermoplastic matrix |  | M1 | M2 | M3 |
| UL94 at 0.5 mm | Class | V-0 | V-0 | n.d. |
| Flexural strength | Assessment | + | + | ○ |

The test results show that use of the inventive thermoplastic matrix attains not only better flame retardancies but, surprisingly, also at least equal flexural strengths which indicates that as a result of the specific combination of the components the attachment of the matrix polymer to the fibre material is maintained and an inventive fibre-matrix semifinished product is accordingly not liable to delamination.

What is claimed is:

1. A fibre-matrix semi-finished product comprising:
one or more semi-finished fibre product plies made of endless fibres, wherein:
the endless fibers are in the form of wovens, non-crimp fabrics, multiaxial non-crimp fabrics, stitched fabrics, braids, batts, felts, mats and unidirectional fibre strands or mixtures of these materials; and
the semi-finished fibre product plies each have a basis weight of 5 g/m² to 3000 g/m²; and
a compound impregnating the entirety of all the semi-finished fibre product plies, the compound comprising:
component A)—at least one polyamide having a relative solution viscosity of 2.0 to 4.0 in m-cresol according to DIN EN ISO 307 at 25° C., as the matrix polymer, and
component B)—based on 100 parts by weight of component A), 5 to 100 parts by weight of at least one organic phosphinic acid salt of formula (I) and/or a diphosphinic acid salt of formula (II), and/or polymers thereof,

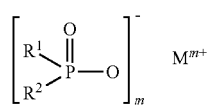 (I)

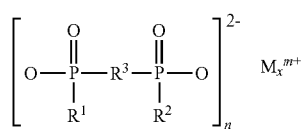 (II)

wherein:
R¹ and R² are identical or different and represent a linear or branched $C_1$-$C_6$-alkyl, and/or $C_6$-$C_{10}$-aryl,
R³ represents linear or branched $C_1$-$C_{10}$-alkylene, $C_6$-$C_{10}$-arylene or $C_1$-$C_6$- alkylarylene or aryl-$C_1$-$C_6$-alkylene,
M represents aluminium, zinc or titanium and/or a protonated nitrogen base,
m is an integer from 1 to 4,
n is an integer from 1 to 3,
x is 1 or 2, and
n, x and m in formula (II) simultaneously adopt only integers such that the diphosphinic acid salt of formula (II) as a whole is uncharged, and
the fibre-matrix semi-finished product has a volume fraction of fibre materials of 25% to 65%, defined according to DIN 1310, and a volume fraction of air or gas of less than 15% and
wherein the compound further comprises any one of: C) and D); or C), D) and E), wherein:
component C)—at least one salt of melamine and condensed phosphoric acids;
component D)—zinc borate; and
component E)—talc,
and a weight ratio of component B) to component C) is 95:5 to 60:40, based on 100 parts by weight of a sum of component B) and component C); component D) is in an amount of 0.1 to 20 parts by weight, based on 100 parts by weight of component A); and if component E) is present, component E) is in amount of 0.01 to 50 parts by weight, based on 100 parts by weight of component A).

2. The fibre-matrix semi-finished product according to claim 1, wherein M is aluminium.

3. The fibre-matrix semi-finished product according to claim 1, wherein the protonated nitrogen bases are the protonated bases of 1,3,5-triazine compounds.

4. The fibre-matrix semi-finished product according to claim 1, wherein R¹ and R² are identical or different and represent linear or branched $C_1$-$C_6$-alkyl and/or phenyl.

5. The fibre-matrix semi-finished product according to claim 1, wherein the product is at least one of: over-moulded, under-moulded, surround-moulded, or has moulded-on functional elements.

6. The fibre-matrix semi-finished product according to claim 1, wherein the product is at least one of: over-moulded via an in-mould process IMF, under-moulded via an in-mould process IMF, surround-moulded, via an in-mould process IMF, or has functional elements moulded-on via an in-mould process IMF.

7. The fibre-matrix semi-finished product according to claim 1, wherein the product comprises 1 to 100 semi-finished fibre product plies, and the endless fibres are in the form of wovens or non-crimp fabrics.

8. The fibre-matrix semi-finished product according to claim 6, wherein the endless fibres are in the form of wovens.

9. A process for producing a single-layered fibre-matrix semi-finished product, the process comprising:
applying a polymer compound to one or more semi-finished fibre product plies made of endless fibres, wherein:
each of the semi-finished fibre product plies has a basis weight of 5 g/m² to 3000 g/m²; and
the semi-finished fibre product plies comprise the endless fibres in the form of wovens, non-crimp fabrics, multiaxial non-crimp fabrics, stitched fabrics, braids, batts, felts, mats and unidirectional fibre strands or mixtures of these materials; and the polymer compound comprises:

component A)—at least one polyamide having a relative solution viscosity of 2.0 to 4.0 in m-cresol according to DIN EN ISO 307 at 25° C., and component B)—based on 100 parts by weight of component A), 5 to 100 parts by weight of at least one organic phosphinic acid salt of formula (I) and/or a diphosphinic acid salt of formula (II) and/or polymers thereof,

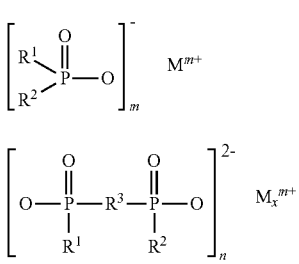

wherein $R^1$ and $R^2$ are identical or different and represent a linear or branched $C_1$-$C_6$-alkyl, and/or $C_6$-$C_{10}$-aryl;

$R^3$ represents linear or branched $C_1$-$C_{10}$-alkylene, $C_6$-$C_{10}$-arylene or $C_1$-$C_6$- alkylarylene or aryl-$C_1$-$C_6$-alkylene;

M represents aluminium, zinc or titanium and/or a protonated nitrogen base;

m is an integer from 1 to 4;

n is an integer from 1 to 3;

x is 1 or 2, and n, x and m in formula (II) simultaneously adopt only integers such that the diphosphinic acid salt of formula (II) as a whole is uncharged; and wherein the compound further comprises any one of: C) and D); or C), D) and E), wherein:

component C)—at least one salt of melamine and condensed phosphoric acids;

component D)—zinc borate; and component E)—talc, and a weight ratio of component B) to component C) is 95:5 to 60:40, based on 100 parts by weight of a sum of component B) and component C); component D) is in an amount of 0.1 to 20 parts by weight, based on 100 parts by weight of component A); and if component E) is present, component E) is in amount of 0.01 to 50 parts by weight, based on 100 parts by weight of component A);

heating the semi-finished fibre product plies with the polymer compound to a temperature greater than or equal to the melting temperature of the at least one polyamide in the compound, and applying pressure to the plies to impregnate the polymer compound into the plies and consolidate the entirety of all of the semi-finished fibre product plies to provide a composite having a volume fraction of fibre materials of 25% to 65% defined according to DIN 1310, and a volume fraction of air or gas of less than 15%; and cooling and solidifying the polymer compound to obtain a fibre-matrix semi-finished product.

10. An article of manufacture comprising at least one fibre-matrix semi-finished product according to claim 1.

11. The article of manufacture according to claim 10, wherein the article is a component of: passenger vehicles, heavy goods vehicles, aircraft, aerospace vehicles, trains, garden appliances, domestic appliances, computer hardware, handheld electronic devices, leisure articles, sports equipment, machines, buildings, photovoltaic systems, or mechanical devices.

12. The fibre-matrix semi-finished product according to claim 1, wherein:

the product comprises 2 to 40 semi-finished fibre product plies made of endless fibres;

the semi-finished fibre product plies each have a basis weight of 100 g/m² to 900 g/m²;

component A) has a relative solution viscosity of 2.2 to 3.5 in m-cresol according to DIN EN ISO 307 at 25° C.;

the compound comprises 10 to 65 parts by weight of component B);

the volume fraction of fibre materials is 30% to 55%, defined according to DIN 1310; and the volume fraction of air or gas is less than 10%.

13. The fibre-matrix semi-finished product according to claim 1, wherein:

the product comprises 2 to 10 semi-finished fibre product plies made of endless fibres;

the semi-finished fibre product plies each have a basis weight of 150 g/m² to 750 g/m²;

component A) has a relative solution viscosity of 2.4 to 3.1 in m-cresol according to DIN EN ISO 307 at 25° C.;

the compound comprises 20 to 60 parts by weight of component B);

the volume fraction of fibre materials is 40% to 50%, defined according to DIN 1310; and the volume fraction of air or gas is less than 5%.

* * * * *